Patented Mar. 28, 1950

2,501,892

UNITED STATES PATENT OFFICE 2,501,892

CONDENSATION PRODUCT OF 6-SULFANILAMIDO-3-METHYL-PYRIDAZINE WITH FORMALDEHYDE

Jean Druey, Riehen, Switzerland, assignor to Ciba Pharmaceutical Products, Inc., Summit, N. J.

No Drawing. Application September 28, 1948, Serial No. 51,646. In Switzerland October 9, 1947

1 Claim. (Cl. 260—239.7)

This invention provides a process for the manufacture of a condensation product of formaldehyde with 6-sulphanilamido-3-methyl-pyridazine. This new product has more valuable therapeutic properties than 6-sulphanilamido-3-methyl-pyridazine itself.

The new condensation product is made by reacting 6-sulphanilamido-3-methyl-pyridazine with formaldehyde. Instead of formaldehyde itself there may be used an agent yielding formaldehyde, such as paraformaldehyde or hexamethylene tetramine. The reaction is advantageously conducted in the presence of a diluent, such as water, a dilute acid or an organic solvent, for example, alcohol.

The production of the new condensation product, and especially the possibility of isolating it in a form suitable for therapeuatic use, could not be foreseen. Certain sulphanilamides of the heterocyclic series yield only greasy reaction products with formaldehyde.

It is intended to use the products of the invention as medicaments.

The following example illustrates the invention, the parts being by weight unless otherwise stated, and the relationship of parts by weight to parts by volume being the same as that of the gram to the cubic centimeter:

26.4 parts of 6-sulphanilamido-3-methyl pyridazine are suspended in 250 parts by volume of water, and brought into solution by the addition of 25 parts by volume of concentrated hydrochloric acid. 15 parts by volume of formaldehyde solution of 40 per cent. strength are then gradually added dropwise, while stirring. The reaction product immediately begins to separate in finely divided form. After the whole of the formaldehyde solution has been added, the mixture is allowed to stand for one hour, and then filtered with suction. The filter residue is thoroughly washed with water, suspended in water, and the last traces of acid are neutralised with sodium carbonate solution. The mixture is then filtered with suction, and the filter residue is dried at 50° C. and sieved through a fine sieve. There are obtained 26 parts of a yellowish powder, which is insoluble in acids. The product does not have a definite melting point, but begins to decompose above 210° C. After being in contact with a caustic alkali for a short time the product changes and passes into solution.

Having thus described the invention, what is claimed is:

The condensation product of 6-sulphanilamido-3-methyl-pyridazine with formaldehyde, which decomposes above 210° C., is insoluble in acids, possesses valuable therapeutic properties and is obtained by carrying out the condensation reaction in a diluent.

JEAN DRUEY.

REFERENCES CITED

The following references are of record in the file of this patent:

FOREIGN PATENTS

| Number | Country | Date |
|---|---|---|
| 563,629 | Great Britain | Aug. 23, 1944 |

OTHER REFERENCES

Hug, Chem. Abstracts, vol. 29 (1935) p. 752.

Scudi, Ind. and Eng. Chem. (Anly. Ed.), vol. 10 (1938) pp. 346–347.

Kolloff et al., J. Amer. Chem. Soc., vol. 62 (1940) pp. 158–161.

Collazo et al., Chem. Abstracts, vol. 40 (1946), p. 3735.